United States Patent [19]

Fukuhara et al.

[11] Patent Number: 4,786,448

[45] Date of Patent: Nov. 22, 1988

[54] PLASTIC PROCESSING METHOD OF PRESSURE OR PRESSURELESS SINTERED CERAMIC BODY

[75] Inventors: Mikio Fukuhara; Yuji Katsumura; Akira Fukawa; Mutsuo Asakawa; Tomio Urushihata; Isao Miyakawa; Kazuhiro Sawada, all of Kawasaki, Japan

[73] Assignee: Toshiba Tunglogy Co., Ltd., Kawasaki, Japan

[21] Appl. No.: 901,052

[22] Filed: Aug. 27, 1986

[30] Foreign Application Priority Data

Aug. 29, 1985 [JP] Japan .................. 60-188460
Dec. 23, 1985 [JP] Japan .................. 60-290092

[51] Int. Cl.$^4$ .............................. C04B 35/60
[52] U.S. Cl. ...................... 264/65; 264/291; 264/332; 501/153
[58] Field of Search ................ 264/65, 332, 291

[56] References Cited

U.S. PATENT DOCUMENTS

| | | | |
|---|---|---|---|
| 4,292,049 | 9/1981 | Tanaka et al. | 501/153 |
| 4,298,385 | 11/1981 | Claussen | 264/60 |
| 4,343,909 | 8/1982 | Adams et al. | 501/153 |

OTHER PUBLICATIONS

Katsumura et al., "Plastic Deformation in Al$_2$O$_3$-Ti(C$_x$,Ni$_{1-x}$) Ceramics", High Tech Ceramics, Materials Science Monographs, 38C, pp. 2735-2745, (1987).
F. Wakai et al., "Hot Work of Yttria-Stabilized Tetragonal ZrO$_2$ Polycrystals", Second International Symposium, Ceramic Materials and Components for Engines, Lübeck-Travvemuende, F.R.G., Apr., pp. 14-17, 1986.
C. Carry et al., Proc. British Ceramic Soc., 33, pp. 101-115, (1983), "Superplastic Forming Alumina".
F. Wakai et al., "Compressive Deformation of Y$_2$O$_3$-Stabilized ZrO$_2$/Al$_2$O$_3$ Composite", Tigyi Kokai-shi, 94 [9], pp. 1017-1020, (1986).
R. C. Bradt, Advances in Deformation Processing, Plenum Press, N.Y. and London, 1978, (21st Sugamore Army Materials Research Conference Proceedings).

Primary Examiner—James Derrington
Attorney, Agent, or Firm—Foley & Lardner, Schwartz, Jeffery, Schwaab, Mack, Blumenthal & Evans

[57] ABSTRACT

There are disclosed a plastic processing method of the pressure of pressureless sintered ceramic body composed of at least one aluminum-containing compound selected from the group consisting of aluminum oxide, aluminum nitride and aluminum oxynitride and at least one hard compound selected from the group consisting of carbides, nitrides and oxides of titanium, zirconium, hafnium, vanadium, niobium, tantalum, chromium, molybdenum, tungsten and silicon and mutual solid solutions thereof, the content of said at least one aluminum-containing compound is 5 to 95% by volume, comprising subjecting the ceramic body to plastic deformation at a temperature of 1300° C. or higher, under a stress of 15 kg/mm$^2$ or smaller and at a strain rate of $10^{-3}$/sec or less in a reducing atmosphere or in vacuum, and a ceramics-made molded material comprising a composite ceramic body composed of the same as mentioned above.

6 Claims, 2 Drawing Sheets

FIG. I

PLASTIC PROCESSING METHOD OF PRESSURE OR PRESSURELESS SINTERED CERAMIC BODY

BACKGROUND OF THE INVENTION

The present invention relates to a plastic processing method of a ceramic body and a ceramics-made molded material prepared by said plastic processing method and more specifically to a plastic processing method of a ceramic body in which the ceramic body is subjected to plastic deformation so that a ceramic product of complex configurations or large dimensions can be produced, for example, by applying pressing, forging or the like thereto and a ceramics-made molded material formed by said method and useful even at elevated temperatures or in a special environment such as an aqueous, acidic or alkaline solution.

Pressure or pressureless sintered ceramic bodies have attracted attention in various industrial fields, as materials excellent in heat resistance, wear resistance and corrosion resistance. Due to the extremely high hardness of these ceramic bodies, they have generally been worked into desired shapes, for example, by diamond polishing or the like.

Therefore, pressure or pressureless sintered ceramic bodies have been accompanied by problems in their working such that they can hardly be produced as bodies of large dimensions or complex configurations and this leads to increased production costs. These problems are particularly serious for $Al_2O_3$, because this material is employed in the largest volume as a ceramic material having excellent heat resistance, hardness and corrosion resistance and moreover, an economical price.

SUMMARY OF THE INVENTION

It is an object of the present invention to provide a plastic processing method of a ceramic body, in which the ceramic body is subjected to plastic deformation so as to permit application of pressing, foregoing or the like in much the same way as metals. It is a further object of the present invention to provide, among the molded materials which can be formed by said plastic processing method, a ceramics-made molded material which is useful even at elevated temperatures or in a special environment such as in an aqueous acidic or alkaline solution, a molten salt bath and a radiation environment. It is yet another object of the present invention to provide a material which is excellent in mechanical strength and has deformability as well as workability.

The above and other objects, features and advantages of the present invention will become apparent from the following description and the appended claims, taken in conjunction with the accompanying drawing.

In one aspect of this invention, there is thus provided a plastic processing method of a ceramic body in which the sintered ceramic body is composed, as essential components thereof, of at least one aluminum-containing compound selected from aluminum oxide, aluminum nitride and aluminum oxynitride and at least one hard compound selected from the carbides, nitrides and oxides of titanium, zirconium, hafnium, vanadium, niobium, tantalum, chromium, molybdenum, tungsten and silicon and mutual solid solutions thereof. The content of said at least one aluminum-containing compound is 5 to 95% by volume, and the ceramic body is subjected to plastic deformation at a temperature of 1300° C. or higher, under a stress of 15 kg/mm² or smaller and at a strain rate of $10^{-3}$/sec or less in a reducing atmosphere or in vacuum.

Among the molded materials obtained by plastic deforming and processing the pressure or pressureless sintered body, it is particularly preferred that a ceramics-made molded material of the present invention comprise a molded material formed by plastic deforming and processing a composite ceramics body composed of an aluminum compound and a hard compound as essential components. The sintered composite ceramic body has a transverse rupture strength of 80 kg/mm² or higher in special environments such as a high-temperature atmosphere, aqueous acidic or alkaline solution, molten salt bath or a radiation environment the aluminum compound as one of the essential components is contained in an amount of 5–95% by volume and is at least one compound selected from aluminum oxide, aluminum nitride and aluminum oxynitride; and the remaining hard compound is at least one hard compound selected from the carbides, nitrides and oxides of titanium, zirconium, hafnium, vanadium, niobium, tantalum, chromium, molybdenum, tungsten and silicon and mutual solid solutions thereof.

DESCRIPTION OF THE PREFERRED EMBODIMENTS

Figure 1:
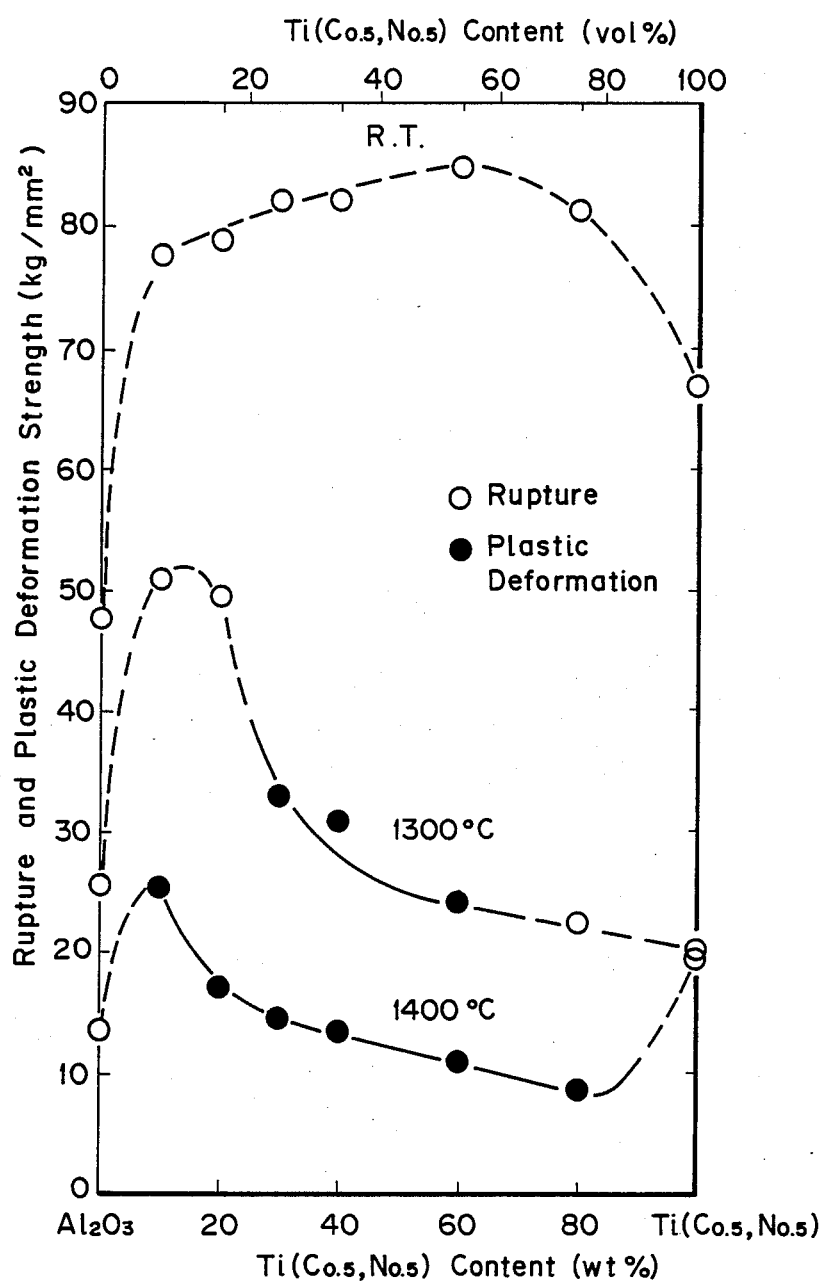
FIG. 1 illustrates diagrammatically the plastic deformation resistance of an $Al_2O_3$—$Ti(C_{0.5},N_{0.5})$ based hot pressed body at each of 1300° C. and 1400° C. as a function of the content of $Ti(C_{0.5},N_{0.5})$ and shows single $Al_2O_3,Ti(C_{0.5},N_{0.5})$ ruptured but a wide composition region showing plastic deformation is present.

The present inventors have carried out an extensive investigation with a view toward achieving the above-mentioned objects. In metals, plastic deformation takes place owing to grain boundary sliding of crystal grains of the metal. This is attributed to metallic bonding which is one type of atomic bonding typical to metals. On the other hand, a ceramic body generally takes another type of atomic bonding which includes both ionic and covalent bonds in combination with some metallic bonds. From the viewpoint of ease of plastic deformation, a ceramic body with a higher proportion of ionic bonds is preferred because the freedom of electrons is higher in ionic bonds as in the above-described metallic bonds. However, a ceramic body containing ionic bonds in such a high proportion is low in high-temperature strength. As a result, it cannot withstand stresses which are applied to cause plastic deformation. A ceramic body containing covalent bonds in a high proportion is excellent in high-temperature strength, but its plastic deformation is difficult to induce. A ceramic body permitting plastic deformation is required to have at least a certain degree of strength prior to its plastic deformation.

With the foregoing in view, the present inventors selected, as materials to be worked, ceramic bodies each of which was composed, at a predetermined volume ratio, of a metal compound containing ionic bonds in a high proportion and another metal compound containing covalent bonds in a high proportion so as to impart a desired degree of strength, namely, each of which contained ionic bonds, metallic bonds and covalent bonds at a desired ratio. In addition, the present inventors also found optimum ranges of various conditions for subjecting such sintered ceramic bodies to plastic deformation, leading to completion of this invention.

As a result of the further investigations, the present inventors were interested in grain boundary sliding of crystalline grains in superplastic deformation of a metal because grain boundary sliding is said to take place in zirconia. However, zirconia is accompanied by such problems as strength reduction at temperatures of 200° to 300 °C. and at higher, reaction with iron group metals, fatigue fracture in water and low thermal conductivity, high specific gravity and low hardness. Under the circumstances, zirconia has had limited applications as an engineering structural material at elevated temperatures. Namely, zirconia involves a problem that its application as a molded material is unsuitable in the special environments described above.

On the other hand, a majority of ceramics which are employed these days are alumina-based ones. If these alumina-based ceramics can be applied to molded materials, enormous advantage can be brought about in view of their properties as starting materials.

With the foregoing in view, the present inventors proceeded with a further extensive investigation focused on ceramics bodies of the Al compound base. As a result of the investigation, superplasticity attributable to heterogeneous grain boundary sliding was discovered. A specific material composition was chosen in light of the superplasticity, thereby making it possible to apply the resultant material to molded materials such as those referred to in the present invention.

As described above, the present invention has two features, i.e., the composition of each ceramic body as a material to be worked and conditions for plastic deformation.

Regarding the first feature, the ceramic body contains as a first essential component at least one Al-containing compound selected from alumina ($Al_2O_3$), aluminum nitride (AlN) and aluminum oxynitride [Al(O,N)] each of which contains ionic bonds in a high proportion. Among these Al-containing compounds, $Al_2O_3$ is considered to be preferable because it contains ionic bonds in a particularly high proportion and has a high hardness and low specific density. The ceramic body is required to contain this Al-containing compound in an amount of 5 to 95% by volume. If its content does not fall within the above-defined range, it becomes difficult to adjust and control ionic bonds, metallic bonds and covalent bonds within their respective suitable proportion ranges. Preferably, the content of $Al_2O_3$ may range from 40 to 70% by volume.

On the other hand, as to the hard compound which is the second essential component, no particular limitation is imposed so long as it is selected from the above-listed hard components. It is, however, preferable to choose a suitable hard compound in accordance with the proportions of ionic bonds and metallic bonds in the above-mentioned Al-containing compound and the application field of the resulting pressure or pressureless sintered body.

The above-mentioned hard compound is at least one hard compound selected from the carbides, nitrides and oxides of titanium (Ti), zirconium (Zr), hafnium (Hf), vanadium (V), niobium (Nb), tantalum (Ta), chromium (Cr), molybdenum (Mo), tungsten (W) and silicon (Si) and mutual solid solutions thereof.

In selecting of a specific hard compound the ratio of ionic bonds to metallic bonds in its combined Al-containing compound, the required resilience, and the application environment and the like of the molded material are all taken into consideration. As specific examples of this hard compound, may be mentioned TiC, ZrC, HfC, VC, NbC, TaC, $Cr_3C_2$, $Mo_2C$, WC and SiC; TiN, ZrN, HfN, VN, NbN, TaN, CrN and $Si_3N_4$; TiO, $TiO_2$, $ZrO_2$, $HfO_2$, $Cr_2O_3$, $Ta_2O_5$ and $SiO_2$; Ti(C,N), Ti(C,O), Ti(N,O), Ti(C,N,O), (Ti,Zr)(C,N), (Ti,Ta)C, (Ti,Nb)C, (Ti,Ta,W)C, and so on.

The above hard compounds may be added either singly or in combination. It is particularly effective to add two or more hard compounds in the form of a solid solution in which the metal compounds are dissolved as solids in each other, because addition of such a solid solution results in the formation of a composite ceramic body having improved strength. This improved strength is brought about because their addition in the form of the solid solution is effective in the elimination of pores during sintering.

It is also preferable to use a Ti-containing metal compound in order to impart a low specific gravity, oxidation resistance and high strength to the resulting pressure or pressureless sintered body, or to use a Zr-containing metal compound in order to obtain a sintered body having high toughness and good thermal insulating property.

Each ceramic body useful in the practice of this invention must contain the above Al compound and hard compound as two essential components. Owing to the combination of these two components, a grain growth inhibitor effect is exhibited against both crystalline grains upon sintering. The above-described sintered composite ceramic body can provide a pressure or pressureless sintered body of fine crystals by incorporation of a grain growth inhibitor in addition to the above essential components, because the grain growth inhibitor can enhance the grain growth inhibiting effect. The grain growth inhibitor is composed of at least one compound selected from the oxides and nitrides of metals of Groups IIa, IIIa and VIII of the Periodic Table and rare earth elements and their mutual solid solutions. Its suitable content range may be 0.1 to 7% by volume. As specific examples of such a grain growth inhibitor, may be mentioned MgO, CaO, $Sc_2O_3$, $Y_2O_3$, NiO, CoO, FeO, $Fe_2O_3$, $Fe_3O_4$, $La_2O_3$, $Ce_2O_3$, $Pr_2O_3$, $Nd_2O_3$, $Sm_2O_3$, $Eu_2O_3$, $Dy_2O_3$, $Er_2O_3$, $Tb_2O_3$, $Mg_3N_2$, $Ca_3N_2$, ScN, YN, CeN, DyN, $Y_3Fe_5O_{12}$, $NiFe_2O_4$, $MgFe_2O_4$, $LaFeO_3$, etc. If the content of the grain growth inhibitor is smaller than 0.1% by volume, it is difficult to bring about its effect to any significant extent. On the other hand, if it is added in amounts in excess of 7% by volume, grain growth is conversely induced and moreover, fragile compounds are caused to segregate at grain boundaries. It is therefore not preferred to add the grain growth inhibitor in any amounts outside the above-specified range.

The above-described ceramic body, which is useful as a material to be worked in accordance with this invention, can be produced easily by proportioning and kneading the above-mentioned respective compounds in their powder forms and then forming and sintering the resultant mixture in a manner known per se in the art. The strength of the resultant ceramic body has been significantly improved as compared with the strength of sintered bodies obtained either by pressure or pressureless sintering the individual components separately. The mechanism of superplastic deformation of a pressure or pressureless sintered body can be attributed to sliding along crystalline grains boundaries as in the case of metals. More and more crystalline grains boundaries are thus formed to facilitate plastic deformation as the crystalline grain size of a ceramic body decreases. For these reasons, the crystalline grain size of a ceramic body may preferably be 1 μm or smaller.

A description will next be made of the second feature of the method of this invention, namely, conditions for the plastic deformation of each ceramic body, specifically, the atmosphere, deformation temperature, stress and strain rate.

It is necessary to carry out the plastic processing in a non-oxidizing atmosphere such as Ar or $N_2$ or in vacuum so as to avoid oxidation of the composite ceramic body and the mold employed for the ceramic body.

Further, the deformation temperature is required to be 1300° C. or higher. Any deformation temperature lower than 1300° C. results in the development of cracks or fracture when a stress is applied. A range of 1300° to 1500 ° C. is preferred particularly for the prevention of oxidation of the composite ceramic body and over limitation of the mold strength.

Next, the deformation stress is set at 15 kg/mm$^2$ or lower. If this stress exceeds 15 kg/mm$^2$, the mold is fractured and the ceramic body develops cracks. In order to avoid these problems it is preferable to set this stress below 10 kg/mm$^2$.

On the other hand, the strain rate is set as $10^{-3}$/sec or smaller. If the strain rate exceeds $10^{-3}$/sec, the composite ceramic body is fractured without undergoing deformation. Preferably, the strain rate may range from $10^{-5}$ to $10^{-3}$/ sec. Here, the stress and strain rate can be achieved by a press or the like. In the case of a ceramics-made plastic material having a simple shape typified by the belleville spring 2, it can easily be provided by using a jig having a shape close to the final configuration of the intended product.

Since these conditions are not independent from one another but mutually interact, is preferable to set them at suitable values collectively.

As a material for a mold useful in such a plastic deformation step, it is preferable to employ a material excellent in oxidation resistance, wear resistance and compressive strength. Graphite, $Si_3N_4$, SiC and the like may be mentioned specifically, with SiC being preferable.

When a ceramic product of a complex shape is desired, it is effective to apply plastic deformation after polishing the surface of a corresponding ceramic body with grits or a grinding stone in advance because even after the deformation, the surface of the molded material is allowed to retain the same smoothness as its surface before the deformation.

EXAMPLES

EXAMPLE 1

Using powdery raw materials which had been obtained by mixing Ti($C_{0.5}$, $N_{0.5}$) powder in various proportions to $Al_2O_3$ powder, the ceramic bodies of various compositions were produced by mixing, drying, molding and then hot-pressing said mixtures. From each of the ceramic bodies, specimens of 4×3×35 mm were prepared. Following the procedure of JIS R 1601 "Bending of ceramics (1981)", the bending plastic deformation strength of the specimens were measured respectively at room temperature, 1300 ° C. and 1400 ° C. in an Ar atmosphere. Results are diagrammatically shown in FIG. 1.

As is apparent from FIG. 1, it has been confirmed that at room temperature the transverse rupture strength of the complex materials is at a maximum at about 60% by weight of Ti($C_{0.5}$,$N_{0.5}$). The materials with 20 to 80% by volume of Ti($C_{0.5}$,$N_{0.5}$) exhibit plastic deformation at 1400 ° C., while it occurs within 30 to 60% by weight at 1300 ° C.

EXAMPLES 2 to 11

Using starting raw material powders capable of yielding various Al-containing compounds, hard compounds and grain growth inhibitor, a variety of samples were proportioned as shown in Table 1. Those samples were mixed, dried, formed and hot-pressed to obtain sintered bodies of 3φ×15 mm and 3×4×30 mm. Various properties of those hot-pressed bodies are also shown in Table 1. Of these hot-pressed bodies, those of 3φ×15 mm were caused to undergo plastic deformation in tensile test. On the other hand, the hot-pressed bodies of 3×4×30 mm were also caused to undergo plastic deformation in a compression test. The tensile test was carried out in accordance with the tensile test for metal materials in JIS (Japan Industrial Standard) Z 2201. In the tensile test, elongations (%) after rupture were measured. The compression test was conducted by following JIS R 1601. In the compression test, bending angles (°) until development of cracks or rupture were measured. In the tensile and compression tests, the degrees of deformation of the hot-pressed bodies [elongations (%) or bending angles (°)] and the hardness and the bending strength of deformed parts were measured. Measurement results are shown in Table 2, along with conditions for the plastic deformation in the tensile and compression tests.

COMPARATIVE EXAMPLES 1 to 5

In the same manner as in Examples 2 to 11, ceramic bodies having various proportions as shown in Table 1 were obtained and the same measurements were carried out as in Examples 2 to 11. The results are shown in Tables 1 and 2.

The molded materials shown in Table 2 of this invention are not limited to those containing an Al compound and a hard compound only as their components but include those added further with a grain growth inhibitor (Examples 6 to 11). After polishing each of the surfaces of the ceramic bodies shown in Table 1 by a diamond grindstone, they were caused to undergo plastic deformation at elevated temperatures so that molded materials given in the column under "Application examples of molded material" in Table 2 were fabricated.

Those produced as the belleville spring 2 had the following dimensions: outer diameter=23 mmφ, inner diameter=8 mmφ, thickness=0.8 mm, and inclination=5°.

The thus-obtained molded materials were all able to satisfy the strength and other requirements specified by the Japan Industrial Standard (JIS). Especially, they did not show any appreciable reduction in strength even at elevated temperatures, for example, at 1100 °C. and exhibited effective resilience.

On the other hand, the composite ceramic bodies of Comparative Examples 1-4 were fractured and could not be prepared as molded materials. While in Comparative Example 5 plastic deformation could be carried out, the molded material lost its resilience at 600 °C. or higher.

Figure 2:
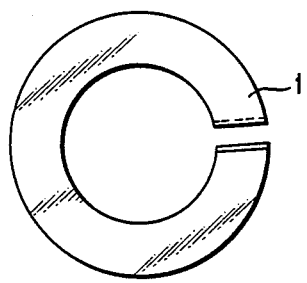
FIG. 2 is a front view of a ceramics-made molded material according to one embodiment of this invention, in which the molded material takes the form of a lock washer.
Figure 3:
FIG. 3 is a side view of the ceramics-made molded material of FIG. 2.
Figure 4:
FIG. 4 is a cross-sectional view of a ceramics-made molded material according to another embodiment of this invention, in which the molded material takes the form of a belleville spring.

In FIG. 2 and FIG. 3, a belleville spring prepared in Example 1 is shown and in FIG. 4, a lock washer prepared in Example 1 is also shown.

Referring first to FIG. 2 and FIG. 3, numeral 1 indicates a ceramics-made lock washer of a somewhat-twisted and approximately C-like configuration. Owing to the provision of the twisted shape and a slit, resilience has been imparted. On the other hand, FIG. 4 illustrates a belleville spring 2, in which resilience has been imparted by its conical configuration.

The lock washer 1 and belleville spring 2 are both made of ceramics as described above. They are each formed of a composite ceramic body composed of the aluminum compound and the hard compound in the aforesaid composition as essential components.

The lock washer 1 shown in FIGS. 2 and 3 may be produced, for example, by the following two methods.

In a first method, a composite ceramic body in the form of an approximately C-shaped ring with a slit is subjected, as a stock, to hot plastic deformation by means of a die.

In a second method, a slit is formed in a pre-sintered ring-like body so as to form the body into an approximately C-like shape. The pre-sintered C-like body is thereafter sintered, under a load, on a base the top surface of which has a shape conforming the intended lock washer.

Thus, the first method is usually relied upon in view of surface finishing. Here, conditions for the plastic deformation of the sintered composite ceramic body, i.e., atmosphere, deformation temperature, stress and strain rate are important.

The thus-obtained lock washer 1 has a strength of at least 80 kg/mm² in terms of bending strength up to 1000 °C. and is superb in heat resistance, oxidation resistance and chemical resistance. It can therefore exhibit its advantages in a special environment.

Although the present invention was employed to fabricate lock washers, leaf springs, spring washers and compression springs in the Examples, it can of course be applied to fabricate volute springs, torsion springs and the like.

As shown in the above examples the values for C, O and N are represented by the following formulas: $Ti(C_x, O_y, N_{1-x-y})$ and $Ti(C_x, N_{1-x})$ wherein $X=0.5-0.9$ and $Y=0.05$

TABLE 1

| | | Various properties of hot-pressed body | | | |
|---|---|---|---|---|---|
| | Composition (% by weight) | Density (g/cm³) | Hardness (Hv) | Bending strength (kg/mm²) | Thermal conductivity (Kcal/mh °C.) |
| Example 2 | 60 $Al_2O_3$—40 $Ti(C_{0.9}, N_{0.05}, O_{0.05})$ | 4.35 | 2230 | 83.1 | 20.4 |
| Example 3 | 50 $Al_2O_3$—50 $Ti(C_{0.65}, N_{0.3}, O_{0.05})$ | 4.22 | 2250 | 84.5 | 21.9 |
| Example 4 | 40 $Al_2O_3$—60 $Ti(C_{0.5}, N_{0.45}, O_{0.05})$ | 4.53 | 2270 | 86.3 | 23.0 |
| Example 5 | 32 $Al_2O_3$—13 AlN—55 $(Ti_{0.9}, Zr_{0.1})$—$(N_{0.8}, O_{0.2})$ | 4.49 | 2150 | 77.0 | 22.5 |
| Example 6 | 35.5 $Al(O_{0.9}, N_{0.1})$—15 $ZrO_2$—45 TiC—4.5 $CeO_2$ | 4.62 | 2030 | 109.8 | 18.1 |
| Example 7 | 52 $Al(O_{0.9}, N_{0.1})$—33 $(Zr_{0.8}, Hf_{0.2})$—15 $Ti(C_{0.7}, N_{0.3})$ | 7.76 | 1870 | 201.3 | 9.4 |
| Example 8 | 51.5 $Al_2O_3$—18 $V_2O_3$—30 $Ti(C_{0.9}, N_{0.1})$—0.5 MgO | 4.38 | 2210 | 99.0 | 18.7 |
| Example 9 | 58.3 $Al_2O_3$—8 $Nb_2O_5$—33 $TiC_{0.9}$—0.7 NiO | 4.63 | 2250 | 102.5 | 19.0 |
| Example 10 | 44.5 $Al_2O_3$—55 $(Ti_{0.93}, W_{0.07})$—$(C_{0.9}, N_{0.05}, O_{0.05})$—0.5 CoO | 4.92 | 2260 | 96.2 | 22.5 |
| Example 11 | 46.8 $Al_2O_3$—40 $ZrO_2$—5 $Ti(C_{0.9}, N_{0.1})$—2 WC—6.2 $Y_2O_3$ | 4.54 | 1540 | 93.5 | 8.3 |
| Comparative example 1 | 3 $Al_2O_3$—97 $Ti(C_{0.9}, N_{0.05}, O_{0.05})$ | 4.90 | 2090 | 55.0 | 29.0 |
| Comparative example 2 | 97 $Al_2O_3$—3 $Ti(C_{0.65}, N_{0.3}, O_{0.05})$ | 4.01 | 1970 | 45.8 | 27.7 |
| Comparative example 3 | 99.5 $Al_2O_3$—0.5 MgO | 3.98 | 2050 | 48.0 | 14.4 |
| Comparative example 4 | 100 $Ti(C_{0.5}, N_{0.45}, O_{0.05})$ | 5.18 | 2180 | 63.5 | 29.5 |
| Comparative example 5 | 93.5 $(Zr_{0.8}, Hf_{0.2})O_2$—6.5 $Y_2O_3$ | 6.80 | 1320 | 140.4 | 2.5 |

TABLE 2

| | Condition for plastic deformation | | | | | | |
|---|---|---|---|---|---|---|---|
| | Testing method | Temperature (°C.) | Strain rate (1/sec) | Time (min) | Strain (kg/mm²) | Atmosphere | Mold material |
| Example 2 | Compression | 1430 | $4 \times 10^{-4}$ | 40 | 14 | Ar | SiC |
| Example 3 | Tensile | 1400 | $6 \times 10^{-4}$ | 30 | 14 | Ar | SiC |
| Example 4 | Tensile | 1350 | $8 \times 10^{-4}$ | 20 | 10 | Ar | $Si_3N_4$ |
| Example 5 | Compression | 1400 | $8 \times 10^{-4}$ | 25 | 10 | Ar | $Si_3N_4$ |
| Example 6 | Compression | 1350 | $2 \times 10^{-4}$ | 30 | 8 | Ar | SiC |
| Example 7 | Tensile | 1380 | $2 \times 10^{-4}$ | 25 | 6 | Ar | SiC |
| Example 8 | Compression | 1250 | $5 \times 10^{-4}$ | 30 | 15 | Ar | $Si_3N_4$ |
| Example 9 | Tensile | 1300 | $5 \times 10^{-4}$ | 20 | 15 | Ar | $Si_3N_4$ |
| Example 10 | Tensile | 1350 | $2 \times 10^{-4}$ | 20 | 12 | Ar | $Si_3N_4$ |
| Example 11 | Compression | 1400 | $1 \times 10^{-5}$ | 30 | 8 | Ar | SiC |
| Comparative example 1 | Compression | 1500 | $5 \times 10^{-4}$ | 60 | 22 | Ar | SiC |
| Comparative example 2 | Compression | 1500 | $1 \times 10^{-5}$ | 50 | 22 | $N_2$ | SiC |
| Comparative | Compression | 1500 | $1 \times 10^{-5}$ | 50 | 20 | $N_2$ | SiC |

TABLE 2-continued

| | | | | | | | |
|---|---|---|---|---|---|---|---|
| example 3 | | | | | | | |
| Comparative example 4 | Compression | 1500 | $5 \times 10^{-4}$ | 50 | 20 | Ar | SiC |
| Comparative example 5 | Compression | 1500 | $2 \times 10^{-4}$ | 40 | 3 | Ar | SiC |

| | After test | | | Application examples of molded material* |
|---|---|---|---|---|
| | Degree of deformation | Hardness (Hv) | Flexural strength (kg/mm$^2$) | |
| Example 2 | 173° | 2290 | 85.3 | B, L |
| Example 3 | 35% | 2310 | 87.9 | B, L |
| Example 4 | 75% | 2350 | 93.2 | B, L |
| Example 5 | 158° | 2430 | 85.2 | S, B |
| Example 6 | 180° | 2110 | 118.3 | F, L |
| Example 7 | 25% | 1940 | 212.3 | B, L |
| Example 8 | 180° | 2250 | 101.4 | L, C |
| Example 9 | 75% | 2310 | 105.8 | B, C |
| Example 10 | 60% | 2330 | 99.7 | B, L |
| Example 11 | 175° | 1810 | 194.0 | C, B, FS |
| Comparative example 1 | 7° | — | — | — |
| Comparative example 2 | 7° | — | — | — |
| Comparative example 3 | 5° | — | — | — |
| Comparative example 4 | 8° | — | — | — |
| Comparative example 5 | 33° | — | — | — |

*B: belleville spring; L: leaf spring; S: spring washer; F: fastening washer; C: compression spring; and FS: flat spiral spring.

Having now fully described the invention, it will be apparent to one of ordinary skill in the art that many changes and modifications can be made thereto without departing from the spirit or scope of the invention as set forth herein.

As clearly seen from the above explanation, in the method of this invention, the ceramic body having such a composition that ionic bonds, metallic bonds and covalent bonds are suitably contained in combination is used as a material to be worked and specific conditions such as those described above have been chosen for the plastic deformation of the thus-selected ceramic body. The ceramic body is allowed to undergo plastic deformation more easily compared with the use of a ceramic body containing ionic bonds in a high proportion such as alumina as is, because the ceramic body itself has an improved strength prior to its plastic deformation and contains, in some proportion, ionic bonds capable of contributing to intergranular slip upon plastic deformation. Accordingly, use of the method of this invention makes it possible to perform pressing, forging or the like of ceramic bodies although such working has heretofore been considered to be extremely difficult. The method of this invention can therefore be used for the economical production of parts having large dimensions or complex configurations, for example, torsion materials such as cutting end mill blades; food extrusion feeders; hydraulic pump screws; screws for grain feeder pumps; fastening washers; turbine propellers; spinning thread guides; car rotors; cutters; scissors; magnetic tape slitters; heaters for heating element; etc. Moreover, the thus-deformed bodies can be obtained with smooth surfaces. Therefore, the method of this invention has an extremely large industrial value.

Further, since the present invention is a ceramics-made molded material formed by plastic deformation processing of an Al-containing compound series composite ceramics body, the following effects may be expected.

First of all, sufficient formability and workability are recognized on the ceramics-made plastic material of this invention. Namely, the composite ceramic body may be provided as a primary stock. After grinding it into a secondary stock, working such as pressing, pulling, bending and/or the like may then be applied to the secondary stock by using conventional means such as press, jig, extruder and the like so that it is obtained as a final product.

Secondly, owing to its sufficiently high mechanical strength, it can be used under a high load. This advantage has been brought about, since the selection of the specific composition as a composite ceramic body of mainly the Al-containing compound has led to a high material strength.

As a third advantage, it can be used in an expanded application field because it is usable in certain special environments. Owing to its high heat and corrosion resistance, it can be successfully used even in a special environment such as a high-temperature atmosphere, an aqueous acidic or alkaline solution, a molten salt bath or a radiation environment.

We claim:

1. In a plastic processing method of a pressure or pressureless sintered ceramic body, the improvement wherein the ceramic body consists essentially of at least one of Ti($C_x$, $O_y$, $N_{1-x-y}$) and Ti($C_x$, $N_{1-x}$) wherein $x = 0.5-0.9$ and $y = 0.05$ and from 5 to 95% by volume of at least one aluminum-containing compound selected from the group consisting of aluminum oxide, aluminum nitride and aluminum oxynitride, and the ceramic body is subjected to plastic deformation at a temperature of 1300° C. or higher, under a stress of 15 kg/mm$^2$ or smaller and at a strain rate of $10^{-3}$/sec or less in a reducing atmosphere or in vacuum.

2. A plastic processing method according to claim 1 wherein the sintered ceramic body additionally contains at least one grain growth inhibitor, which is selected from the group consisting of oxides and nitrides of elements of Group IIa, IIIa and VIII of the Periodic Table and rate earth elements and mutual solid solutions thereof, in an amount of 0.1 to 7% by volume.

3. A plastic processing method according to claim 2, wherein said grain growth inhibitor is selected from the group consisting of MgO, CaO, $Sc_2O_3$, $Y_2O_3$, NiO, CoO, FeO, $Fe_2O_3$, $Fe_3O_4$, $La_2O_3$, $Ce_2O_3$, $Pr_2O_3$, $Nd_2O_3$, $Sm_2O_3$, $Eu_2O_3$, $Dy_2O_3$, $Er_2O_3$, $Tb_2O_3$, $Mg_3N_2$, $Ca_3N_2$, ScN, YN, CeN, DyN, $Y_3Fe_5O_{12}$, $NiFe_2O_4$, $MgFe_2O_4$ and $LaFeO_3$.

4. A plastic processing method according to claim 1 wherein said hard compound is $Ti(C_{0.5}N_{0.5})$.

5. A plastic processing method according to claim 4 wherein said aluminum containing compound is $Al_2O_3$.

6. A plastic processing method according to claim 5 wherein the content of $Al_2O_3$ is 40 to 70% by volume.

* * * * *